US012812644B2

(12) United States Patent
Gao et al.

(10) Patent No.: US 12,812,644 B2
(45) Date of Patent: Nov. 24, 2026

(54) DATA TRANSMISSION METHOD, DEVICE, TERMINAL, AND BASE STATION

(71) Applicant: DATANG MOBILE COMMUNICATIONS EQUIPMENT CO., LTD., Beijing (CN)

(72) Inventors: Xueyuan Gao, Beijing (CN); Xin Su, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 1163 days.

(21) Appl. No.: 17/635,678

(22) PCT Filed: Jul. 28, 2020

(86) PCT No.: PCT/CN2020/105175
§ 371 (c)(1),
(2) Date: Feb. 15, 2022

(87) PCT Pub. No.: WO2021/031805
PCT Pub. Date: Feb. 25, 2021

(65) Prior Publication Data

US 2022/0287021 A1 Sep. 8, 2022

(30) Foreign Application Priority Data

Aug. 16, 2019 (CN) ......................... 201910760451.8

(51) Int. Cl.
*H04W 72/20* (2023.01)

(52) U.S. Cl.
CPC .................................. *H04W 72/20* (2023.01)

(58) Field of Classification Search
None
See application file for complete search history.

(56) References Cited

U.S. PATENT DOCUMENTS 12,063,181 B2 * 8/2024 Gao .......................... H04L 1/08
2019/0150164 A1 * 5/2019 Nam ..................... H04L 1/1812
370/329

(Continued)

FOREIGN PATENT DOCUMENTS

CN 109327905 A 2/2019
CN 109600840 A 9/2019

OTHER PUBLICATIONS

First Korean Office Action for Korean Patent Application No. 10-2022-7008349 issued by the Korean Patent Office on Jun. 4, 2024 and its English translation provided by foreign associate.

(Continued)

*Primary Examiner* — Jeffrey M Rutkowski
*Assistant Examiner* — Mehedi S Aley
(74) *Attorney, Agent, or Firm* — Ladas & Parry, LLP

(57) ABSTRACT

The present disclosure provides a data transmission method, a device, a terminal and a base station, wherein the data transmission method includes: receiving redundancy version (RV) identification information sent by a base station; determining an RV basic sequence according to the RV identification information; determining a correspondence relationship between each RV in the RV basic sequence and each transmission occasion; receiving, at each transmission occasion by using a corresponding RV according to the correspondence relationship, physical downlink shared channel (PDSCH) data sent by the base station; wherein, the RV basic sequence is one of at least two predefined RV sequences.

11 Claims, 6 Drawing Sheets

(56) References Cited

U.S. PATENT DOCUMENTS

| | | | | |
|---|---|---|---|---|
| 2019/0173619 | A1 | 6/2019 | Li et al. | |
| 2022/0124768 | A1* | 4/2022 | Frenne | H04L 1/1819 |
| 2022/0248358 | A1* | 8/2022 | Laddu | H04W 56/001 |
| 2022/0248426 | A1* | 8/2022 | Matsumura | H04L 1/1896 |
| 2023/0239864 | A1* | 7/2023 | Kim | H04L 1/1642 370/329 |

OTHER PUBLICATIONS

"Draft Report of 3FPP TSG RAN WG1 #97 v0.2.0 (Reno, USA, May 13-17, 2019)" 3GPP TSG RAN WG1 Meeting #98, R1-190xxxx, Prague, Czech Rep, Aug. 26-30, 2019, Source: MCC Support.

"Enhancements on multi-TRP/panel transmission," 3GPP TSG RAN WG1 #97, R1-1906224, Reno, USA, May 13-17, 2019, Source: NTT DOCOMO, Inc, Agenda Item: 7.2.8.2.

"On multi-TRP and multi-panel," 3GPP TSG RAN WG1 Meeting RAN1#97, R1-1907418, Reno, US, May 13-17, 2019, Source: Ericsson, Agenda Item: 7.2.8.2.

"On multi-TRP and multi-panel," 3GPP TSG RAN WG1 Meeting RAN1#98 R1-1908990, Prague, Czech Republic, Aug. 26-30, 2019, Source: Ericsson, Agenda Item: 7.2.8.2.

Extended European Search Report for European Patent Application 20855498.0 issued on Sep. 8, 2022.

"Summary of AI: 7.2.8.2 Enhancements on Multi-TRP/Panel Transmission of Offline Discussion," 3GPP TSG RAN WG1 Meeting #97, R1-1907706, Reno, USA, May 13-17, 2019, Agenda Item: 7.2.8.2, Source: Huawei, HiSilicon, all pages.

First Office Action for Chinese Patent Application 201910760451.8 issued on Jul. 12, 2021 and its English machine translation provided by Global Dossier.

International Search Report for PCT Application PCT/CN2020/105175 issued on Nov. 2, 2020 and its English translation provided by WIPO.

International Written Opinion for PCT Application PCT/CN2020/105175 issued on Nov. 2, 2020 and its English translation provided by WIPO.

3GPP TSG RAN WG1 #98bis, Chongqing, China, Oct. 14-20, 2019, R1-1910349, CATT "Considerations on multi-TRP/panel transmission," entire document.

3GPP TSG RAN WG1 #99, Reno, USA, Nov. 18-22, 2019, R1-1912176, CATT "Remaining issues on multi-TRP/panel transmission," entire document.

* cited by examiner

DATA TRANSMISSION METHOD, DEVICE, TERMINAL, AND BASE STATION

CROSS-REFERENCE TO RELATED APPLICATIONS

This application is the U.S. national phase of PCT Application No. PCT/CN2020/105175 filed on Jul. 28, 2020, which claims priority to Chinese Patent Application No. 201910760451.8 filed on Aug. 16, 2019, the disclosures of which are incorporated in their entireties by reference herein.

TECHNICAL FIELD

The present disclosure relates to the field of communication technology, and in particular to a data transmission method, a device, a terminal and a base station.

BACKGROUND

There are several typical application scenarios for URLLC (Ultra-Reliable and Low Latency Communications) services, including AR (augmented reality) or VR (virtual reality) entertainment industry, industrial automation, and traffic control requirements including remote driving, and power distribution control requirements, etc. These URLLC services have higher requirements in terms of reliability, latency, and performance. In the R16 (3GPP protocol version 16) research stage, the application based on coordinated multi-point transmission technology between multiple TRP/PANELs (transmission points or panels) is expected to better improve the transmission performance of URLLC. The details are as follows:

1) Multi-TRP/PANEL Transmission Technology

The application of multi-TRP/PANEL in the base station is mainly to improve the coverage of the cell edge, provide a more balanced quality of service in the service area, and perform coordinated data transmission between multiple TRP/PANELs in different ways. From the perspective of network topology, network deployment with a large number of distributed access points and baseband centralized processing will be more conducive to providing a balanced rate experienced by users, and significantly reducing the latency and signaling overhead caused by handover. In the high frequency band, the antenna array of each TRP can be divided into several relatively independent antenna panels, and the shape and number of ports of the entire array can be flexibly adjusted according to deployment scenarios and service requirements. The antenna panels or TRPs can also be connected by optical fibers to facilitate more flexible distributed deployment. Using the coordination between multiple TRPs or panels to transmit or receive from multiple beams of multiple angles can better overcome various shielding or blocking effects and ensure the robustness of link connections, which is suitable for URLLC services to enhance transmission quality and meet reliability requirement.

2) URLLC Enhanced Scheme Based on Coordinated Multi-Point Transmission

The URLLC enhancement schemes based on coordinated multi-point transmission that may be adopted include the following:

Scheme 1 (Space Division Multiplexing (SDM)): on the overlapping time-frequency resources in a slot, each transmission occasion (the transmission occasion actually refers to the signal sent by a TRP on a resource) corresponding to an associated Transmission Configuration Indicator (TCI) state and a set of data corresponding to a DMRS (demodulation reference signal) port;

Scheme 2 (Frequency Division Multiplexing (FDM)): in a slot, each frequency domain resource is associated with a TCI (transmission configuration indication) state, and the frequency domain resources do not overlap each other;

Scheme 3 (Time Division Multiplexing (TDM) at the mini-slot level): in a slot, each time domain resource is associated with a TCI state, and the time domain resources do not overlap with each other; one time domain resource refers to one set of mini-slots (each set can have only one mini-slot); an example is shown in FIG. 1 (the data transmission based on mini-slot representing N-th transmission occasion);

Scheme 4 (TDM at the slot level): each time domain resource is associated with a TCI state, and the time domain resources does not overlap with each other; one time domain resource refers to one set of slots (each set can have only one slot); an example is shown in FIG. 2 (the data transmission based on slot representing N-th transmission occasion).

The above schemes can be further combined, such as FDM+TDM.

However, for schemes 3 and 4 (TDM modes), it is still impossible to clearly determine the mapping relationship between the redundancy versions (RVs) transmitted on multiple TRP/PANELs and the transmission occasions, as well as the specific signaling definition, resulting in the inability to configure the data transmission between the terminal and the base station.

SUMMARY

The present disclosure aims to provide a data transmission method, a device, a terminal and a base station, to solve the problem in the related art of the inability to configure data transmission caused by that the mapping relationship between the RVs transmitted on multiple TRPs/PANELs and the transmission occasions cannot be determined.

To solve the above technical problem, some embodiments of the present disclosure provide a data transmission method applied to a terminal, including:

receiving redundancy version (RV) identification information sent by a base station;

determining an RV basic sequence according to the RV identification information;

determining a correspondence relationship between each RV in the RV basic sequence and each transmission occasion;

receiving, at each transmission occasion by using a corresponding RV according to the correspondence relationship, physical downlink shared channel (PDSCH) data sent by the base station;

wherein, the RV basic sequence is one of at least two predefined RV sequences.

Optionally, before the receiving the redundancy version (RV) identification information sent by the base station, the method further includes:

agreeing with the base station on identification information corresponding to each of the at least two RV sequences;

wherein, the identification information includes the RV identification information.

Optionally, the determining the correspondence relationship between each RV in the RV basic sequence and each transmission occasion includes:

cyclically using each RV in the RV basic sequence in turn as the RV corresponding to each transmission occasion, to obtain the correspondence relationship between each RV in the RV basic sequence and each transmission occasion.

Optionally, the cyclically using each RV in the RV basic sequence in turn as the RV corresponding to each transmission occasion includes:

starting from a first RV in the RV basic sequence, sequentially and cyclically using each RV in the RV basic sequence in turn as the RV corresponding to each transmission occasion.

Optionally, the starting from the first RV in the RV basic sequence, sequentially and cyclically using each RV in the RV basic sequence in turn as the RV corresponding to each transmission occasion includes:

in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence;

where $1 \leqslant n \leqslant q$, and n is an integer.

Optionally, the cyclically using each RV in the RV basic sequence in turn as the RV corresponding to each transmission occasion includes:

starting from an RV corresponding to an RV index, sequentially and cyclically using each RV in the RV basic sequence in turn as the RV corresponding to each transmission occasion.

Optionally, the starting from the RV corresponding to the RV index, sequentially and cyclically using each RV in the RV basic sequence in turn as the RV corresponding to each transmission occasion includes:

an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Optionally, before the determining the correspondence relationship between each RV in the RV basic sequence and each transmission occasion, the method further includes:

agreeing with the base station on the RV index; or receiving the RV index sent by the base station.

Optionally, the RV index includes a first RV sub-index corresponding to a first transmission configuration indication state (TCI state) and a second RV sub-index corresponding to a second TCI state.

Optionally, in a case that there is lack of information or omission of information for the first RV sub-index, the first RV sub-index is the same as the second RV sub-index;

in a case that there is lack of information or omission of information for the second RV sub-index, the second RV sub-index is the same as the first RV sub-index.

Optionally, the RV identification information includes a first sub-identification information corresponding to a first transmission configuration indication state (TCI state) and a second sub-identification information corresponding to a second TCI state.

Optionally, the determining the RV basic sequence according to the RV identification information includes:

determining a first RV basic sequence corresponding to the first TCI state according to the first sub-identification information; and determining a second RV basic sequence corresponding to the second TCI state according to the second sub-identification information;

the determining the correspondence relationship between each RV in the RV basic sequence and each transmission occasion includes:

determining a first correspondence relationship between each RV in the first RV basic sequence and each transmission occasion corresponding to the first TCI state; and determining a second correspondence relationship between each RV in the second RV basic sequence and each transmission occasion corresponding to the second TCI state.

Optionally, in a case that there is lack of information or omission of information for the first sub-identification information, the first sub-identification information is the same as the second sub-identification information;

in a case that there is lack of information or omission of information for the second sub-identification information, the second sub-identification information is the same as the first sub-identification information.

Optionally, the transmission occasion is configured by the base station.

Some embodiments of the present disclosure further provide a data transmission method applied to a base station, including:

sending redundancy version (RV) identification information to a terminal, and determining an RV basic sequence according to the RV identification information;

determining a correspondence relationship between each RV in the RV basic sequence and each transmission occasion;

sending, at each transmission occasion by using a corresponding RV according to the correspondence relationship, physical downlink shared channel (PDSCH) data to the terminal;

wherein, the RV basic sequence is one of at least two predefined RV sequences.

Optionally, before the sending the redundancy version (RV) identification information to the terminal, the method further includes:

agreeing with the terminal on identification information corresponding to each of the at least two RV sequences;

wherein, the identification information includes the RV identification information.

Optionally, the determining the correspondence relationship between each RV in the RV basic sequence and each transmission occasion includes:

cyclically using each RV in the RV basic sequence in turn as the RV corresponding to each transmission occasion, to obtain the correspondence relationship between each RV in the RV basic sequence and each transmission occasion.

Optionally, the cyclically using each RV in the RV basic sequence in turn as the RV corresponding to each transmission occasion includes:

starting from a first RV in the RV basic sequence, sequentially and cyclically using each RV in the RV basic sequence in turn as the RV corresponding to each transmission occasion.

Optionally, the starting from the first RV in the RV basic sequence, sequentially and cyclically using each RV in the RV basic sequence in turn as the RV corresponding to each transmission occasion includes:

in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence;

where $1 \leqslant n \leqslant q$, and n is an integer.

Optionally, the cyclically using each RV in the RV basic sequence in turn as the RV corresponding to each transmission occasion includes:

starting from an RV corresponding to an RV index, sequentially and cyclically using each RV in the RV basic sequence in turn as the RV corresponding to each transmission occasion.

Optionally, the starting from the RV corresponding to the RV index, sequentially and cyclically using each RV in the RV basic sequence in turn as the RV corresponding to each transmission occasion includes:

an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Optionally, before the determining the correspondence relationship between each RV in the RV basic sequence and each transmission occasion, the method further includes:

agreeing with the terminal on the RV index; or sending the RV index to the terminal.

Optionally, the RV index includes a first RV sub-index corresponding to a first transmission configuration indication state (TCI state) and a second RV sub-index corresponding to a second TCI state.

Optionally, in a case that there is lack of information or omission of information for the first RV sub-index, the first RV sub-index is the same as the second RV sub-index;

in a case that there is lack of information or omission of information for the second RV sub-index, the second RV sub-index is the same as the first RV sub-index.

Optionally, the RV identification information includes a first sub-identification information corresponding to a first transmission configuration indication state (TCI state) and a second sub-identification information corresponding to a second TCI state.

Optionally, the determining the RV basic sequence according to the RV identification information includes:

determining a first RV basic sequence corresponding to the first TCI state according to the first sub-identification information; and determining a second RV basic sequence corresponding to the second TCI state according to the second sub-identification information;

the determining the correspondence relationship between each RV in the RV basic sequence and each transmission occasion includes:

determining a first correspondence relationship between each RV in the first RV basic sequence and each transmission occasion corresponding to the first TCI state; and determining a second correspondence relationship between each RV in the second RV basic sequence and each transmission occasion corresponding to the second TCI state.

Optionally, in a case that there is lack of information or omission of information for the first sub-identification information, the first sub-identification information is the same as the second sub-identification information;

in a case that there is lack of information or omission of information for the second sub-identification information, the second sub-identification information is the same as the first sub-identification information.

Optionally, the transmission occasion is configured by the base station.

Some embodiments of the present disclosure further provide a terminal including a storage, a processor, a transceiver, and a computer program stored in the storage and capable of being executed by the processor, wherein the processor is configured to execute the computer program to implement the following steps:

receiving by the transceiver redundancy version (RV) identification information sent by a base station;

determining an RV basic sequence according to the RV identification information;

determining a correspondence relationship between each RV in the RV basic sequence and each transmission occasion;

receiving by the transceiver, at each transmission occasion by using a corresponding RV according to the correspondence relationship, physical downlink shared channel (PDSCH) data sent by the base station;

wherein, the RV basic sequence is one of at least two predefined RV sequences.

Optionally, the processor is further configured to:

agree with the base station on identification information corresponding to each of the at least two RV sequences before receiving the redundancy version (RV) identification information sent by the base station;

wherein, the identification information includes the RV identification information.

Optionally, the processor is specifically configured to:

cyclically use each RV in the RV basic sequence in turn as the RV corresponding to each transmission occasion, to obtain the correspondence relationship between each RV in the RV basic sequence and each transmission occasion.

Optionally, the processor is specifically configured to:

starting from a first RV in the RV basic sequence, sequentially and cyclically use each RV in the RV basic sequence in turn as the RV corresponding to each transmission occasion.

Optionally, the starting from the first RV in the RV basic sequence, sequentially and cyclically using each RV in the RV basic sequence in turn as the RV corresponding to each transmission occasion includes:

in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence;

where $1 \leqslant n \leqslant q$, and n is an integer.

Optionally, the processor is specifically configured to:

starting from an RV corresponding to an RV index, sequentially and cyclically use each RV in the RV basic sequence in turn as the RV corresponding to each transmission occasion.

Optionally, the starting from the RV corresponding to the RV index, sequentially and cyclically using each RV in the RV basic sequence in turn as the RV corresponding to each transmission occasion includes:

an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Optionally, the processor is further configured to:

agree with the base station on the RV index before determining the correspondence relationship between each RV in the RV basic sequence and each transmission occasion; or receive by the transceiver the RV index sent by the base station.

Optionally, the RV index includes a first RV sub-index corresponding to a first transmission configuration indication state (TCI state) and a second RV sub-index corresponding to a second TCI state.

Optionally, in a case that there is lack of information or omission of information for the first RV sub-index, the first RV sub-index is the same as the second RV sub-index;

in a case that there is lack of information or omission of information for the second RV sub-index, the second RV sub-index is the same as the first RV sub-index.

Optionally, the RV identification information includes a first sub-identification information corresponding to a first transmission configuration indication state (TCI state) and a second sub-identification information corresponding to a second TCI state.

Optionally, the processor is specifically configured to:

determine a first RV basic sequence corresponding to the first TCI state according to the first sub-identification information; and determine a second RV basic sequence corresponding to the second TCI state according to the second sub-identification information;

the processor is specifically configured to:

determine a first correspondence relationship between each RV in the first RV basic sequence and each transmission occasion corresponding to the first TCI state; and determine a second correspondence relationship between each RV in the second RV basic sequence and each transmission occasion corresponding to the second TCI state.

Optionally, in a case that there is lack of information or omission of information for the first sub-identification information, the first sub-identification information is the same as the second sub-identification information;

in a case that there is lack of information or omission of information for the second sub-identification information, the second sub-identification information is the same as the first sub-identification information.

Optionally, the transmission occasion is configured by the base station.

Some embodiments of the present disclosure further provide a base station including a storage, a processor, a transceiver, and a computer program stored in the storage and capable of being executed by the processor, wherein the processor is configured to execute the computer program to implement the following steps:

sending redundancy version (RV) identification information to a terminal by the transceiver, and determining an RV basic sequence according to the RV identification information;

determining a correspondence relationship between each RV in the RV basic sequence and each transmission occasion;

sending, at each transmission occasion by using a corresponding RV according to the correspondence relationship, physical downlink shared channel (PDSCH) data to the terminal by the transceiver;

wherein, the RV basic sequence is one of at least two predefined RV sequences.

Optionally, the processor is further configured to:

agree with the terminal on identification information corresponding to each of the at least two RV sequences, before the sending the redundancy version (RV) identification information to the terminal;

wherein, the identification information includes the RV identification information.

Optionally, the processor is specifically configured to:

cyclically use each RV in the RV basic sequence in turn as the RV corresponding to each transmission occasion, to obtain the correspondence relationship between each RV in the RV basic sequence and each transmission occasion.

Optionally, the processor is specifically configured to:

starting from a first RV in the RV basic sequence, sequentially and cyclically use each RV in the RV basic sequence in turn as the RV corresponding to each transmission occasion.

Optionally, the starting from the first RV in the RV basic sequence, sequentially and cyclically using each RV in the RV basic sequence in turn as the RV corresponding to each transmission occasion includes:

in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence;

where $1 \leqslant n \leqslant q$, and n is an integer.

Optionally, the processor is specifically configured to:

starting from an RV corresponding to an RV index, sequentially and cyclically use each RV in the RV basic sequence in turn as the RV corresponding to each transmission occasion.

Optionally, the starting from the RV corresponding to the RV index, sequentially and cyclically using each RV in the RV basic sequence in turn as the RV corresponding to each transmission occasion includes:

an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Optionally, the processor is further configured to:

agree with the terminal on the RV index before determining the correspondence relationship between each RV in the RV basic sequence and each transmission occasion; or send by the transceiver the RV index to the terminal.

Optionally, the RV index includes a first RV sub-index corresponding to a first transmission configuration indication state (TCI state) and a second RV sub-index corresponding to a second TCI state.

Optionally, in a case that there is lack of information or omission of information for the first RV sub-index, the first RV sub-index is the same as the second RV sub-index;

in a case that there is lack of information or omission of information for the second RV sub-index, the second RV sub-index is the same as the first RV sub-index.

Optionally, the RV identification information includes a first sub-identification information corresponding to a first transmission configuration indication state (TCI state) and a second sub-identification information corresponding to a second TCI state.

Optionally, the processor is specifically configured to:

determine a first RV basic sequence corresponding to the first TCI state according to the first sub-identification information; and determine a second RV basic sequence corresponding to the second TCI state according to the second sub-identification information;

the processor is specifically configured to:

determine a first correspondence relationship between each RV in the first RV basic sequence and each transmission occasion corresponding to the first TCI state; and determine a second correspondence relationship between each RV in the second RV basic sequence and each transmission occasion corresponding to the second TCI state.

Optionally, in a case that there is lack of information or omission of information for the first sub-identification information, the first sub-identification information is the same as the second sub-identification information;

in a case that there is lack of information or omission of information for the second sub-identification information, the second sub-identification information is the same as the first sub-identification information.

Optionally, the transmission occasion is configured by the base station.

Some embodiments of the present disclosure further provide a computer readable storage medium having a computer program stored therein, the computer program implementing, when executed by a processor, the steps of the above data transmission method on the terminal side; or the computer program implementing, when executed by a processor, the steps of the above data transmission method on the base station side.

Some embodiments of the present disclosure further provide a data transmission device applied to a terminal, including:

a first reception module for receiving redundancy version (RV) identification information sent by a base station;

a first determination module for determining an RV basic sequence according to the RV identification information;

a second determination module for determining a correspondence relationship between each RV in the RV basic sequence and each transmission occasion;

a second reception module for receiving, at each transmission occasion by using a corresponding RV according to the correspondence relationship, physical downlink shared channel (PDSCH) data sent by the base station;

wherein, the RV basic sequence is one of at least two predefined RV sequences.

Optionally, the device further includes:

a first agreement module for agreeing with the base station on identification information corresponding to each of the at least two RV sequences before receiving the redundancy version (RV) identification information sent by the base station;

wherein, the identification information includes the RV identification information.

Optionally, the second determination module includes:

a first processing sub-module for cyclically using each RV in the RV basic sequence in turn as the RV corresponding to each transmission occasion, to obtain the correspondence relationship between each RV in the RV basic sequence and each transmission occasion.

Optionally, the first processing sub-module includes:

a first processing unit for starting from a first RV in the RV basic sequence, sequentially and cyclically using each RV in the RV basic sequence in turn as the RV corresponding to each transmission occasion.

Optionally, the starting from the first RV in the RV basic sequence, sequentially and cyclically using each RV in the RV basic sequence in turn as the RV corresponding to each transmission occasion includes:

in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence;

where $1 \leqslant n \leqslant q$, and n is an integer.

Optionally, the first processing sub-module includes:

a second processing unit for starting from an RV corresponding to an RV index, sequentially and cyclically using each RV in the RV basic sequence in turn as the RV corresponding to each transmission occasion.

Optionally, the starting from the RV corresponding to the RV index, sequentially and cyclically using each RV in the RV basic sequence in turn as the RV corresponding to each transmission occasion includes:

an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Optionally, the device further includes:

a first processing module for agreeing with the base station on the RV index before determining the correspondence relationship between each RV in the RV basic sequence and each transmission occasion; or receiving the RV index sent by the base station.

Optionally, the RV index includes a first RV sub-index corresponding to a first transmission configuration indication state (TCI state) and a second RV sub-index corresponding to a second TCI state.

Optionally, in a case that there is lack of information or omission of information for the first RV sub-index, the first RV sub-index is the same as the second RV sub-index;

in a case that there is lack of information or omission of information for the second RV sub-index, the second RV sub-index is the same as the first RV sub-index.

Optionally, the RV identification information includes a first sub-identification information corresponding to a first transmission configuration indication state (TCI state) and a second sub-identification information corresponding to a second TCI state.

Optionally, the first determination module includes:

a first determination sub-module for determining a first RV basic sequence corresponding to the first TCI state according to the first sub-identification information; and determining a second RV basic sequence corresponding to the second TCI state according to the second sub-identification information;

the second determination module includes:

a third determination sub-module for determining a first correspondence relationship between each RV in the first RV basic sequence and each transmission occasion corresponding to the first TCI state; and determining a second correspondence relationship between each RV in the second RV basic sequence and each transmission occasion corresponding to the second TCI state.

Optionally, in a case that there is lack of information or omission of information for the first sub-identification information, the first sub-identification information is the same as the second sub-identification information;

in a case that there is lack of information or omission of information for the second sub-identification information, the second sub-identification information is the same as the first sub-identification information.

Optionally, the transmission occasion is configured by the base station.

Some embodiments of the present disclosure further provide a data transmission device applied to a base station, including:

a second processing module for sending redundancy version (RV) identification information to a terminal, and determining an RV basic sequence according to the RV identification information;

a third determination module for determining a correspondence relationship between each RV in the RV basic sequence and each transmission occasion;

a first sending module for sending, at each transmission occasion by using a corresponding RV according to the correspondence relationship, physical downlink shared channel (PDSCH) data to the terminal;

wherein, the RV basic sequence is one of at least two predefined RV sequences.

Optionally, the device further includes:

a second agreement module for agreeing with the terminal on identification information corresponding to each of the at least two RV sequences, before the sending the redundancy version (RV) identification information to the terminal;

wherein, the identification information includes the RV identification information.

Optionally, the third determination module includes:

a second processing sub-module for cyclically using each RV in the RV basic sequence in turn as the RV corresponding to each transmission occasion, to obtain the correspondence relationship between each RV in the RV basic sequence and each transmission occasion.

Optionally, the second processing sub-module includes:

a third processing unit for starting from a first RV in the RV basic sequence, sequentially and cyclically using each RV in the RV basic sequence in turn as the RV corresponding to each transmission occasion.

Optionally, the starting from the first RV in the RV basic sequence, sequentially and cyclically using each RV in the RV basic sequence in turn as the RV corresponding to each transmission occasion includes:

in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence;

where $1 \leqslant n \leqslant q$, and n is an integer.

Optionally, the second processing sub-module includes:

a fourth processing unit for starting from an RV corresponding to an RV index, sequentially and cyclically using each RV in the RV basic sequence in turn as the RV corresponding to each transmission occasion.

Optionally, the starting from the RV corresponding to the RV index, sequentially and cyclically using each RV in the RV basic sequence in turn as the RV corresponding to each transmission occasion includes:

an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Optionally, the device further includes:

a third processing module for agreeing with the terminal on the RV index before determining the correspondence relationship between each RV in the RV basic sequence and each transmission occasion; or send the RV index to the terminal.

Optionally, the RV index includes a first RV sub-index corresponding to a first transmission configuration indication state (TCI state) and a second RV sub-index corresponding to a second TCI state.

Optionally, in a case that there is lack of information or omission of information for the first RV sub-index, the first RV sub-index is the same as the second RV sub-index;

in a case that there is lack of information or omission of information for the second RV sub-index, the second RV sub-index is the same as the first RV sub-index.

Optionally, the RV identification information includes a first sub-identification information corresponding to a first transmission configuration indication state (TCI state) and a second sub-identification information corresponding to a second TCI state.

Optionally, the second processing module includes:

a second determination sub-module for determining a first RV basic sequence corresponding to the first TCI state according to the first sub-identification information; and determining a second RV basic sequence corresponding to the second TCI state according to the second sub-identification information;

the third determination module includes:

a fourth determination sub-module for determining a first correspondence relationship between each RV in the first RV basic sequence and each transmission occasion corresponding to the first TCI state; and determining a second correspondence relationship between each RV in the second RV basic sequence and each transmission occasion corresponding to the second TCI state.

Optionally, in a case that there is lack of information or omission of information for the first sub-identification information, the first sub-identification information is the same as the second sub-identification information;

in a case that there is lack of information or omission of information for the second sub-identification information, the second sub-identification information is the same as the first sub-identification information.

Optionally, the transmission occasion is configured by the base station.

The beneficial effects of the above technical solutions of the present disclosure are as follows:

In the above solutions, by the following steps: receiving redundancy version (RV) identification information sent by a base station; determining an RV basic sequence according to the RV identification information; determining a correspondence relationship between each RV in the RV basic sequence and each transmission occasion; receiving, at each transmission occasion by using a corresponding RV according to the correspondence relationship, physical downlink shared channel (PDSCH) data sent by the base station; wherein, the RV basic sequence is one of at least two predefined RV sequences; the data transmission method can clearly determine the mapping relationship between the RVs and the transmission occasions during coordinated transmission between multiple TRPs/PANELs, and ensure data transmission between the terminal and the base station, thereby solving the problem in the related art of the inability to configure data transmission caused by that the mapping relationship between the RVs transmitted on multiple TRPs/PANELs and the transmission occasions cannot be determined.

DETAILED DESCRIPTION

In order to make the technical problems, technical solutions and advantages to be solved by the present disclosure clearer, a detailed description will be given below in conjunction with the drawings and specific embodiments.

Figure 3:
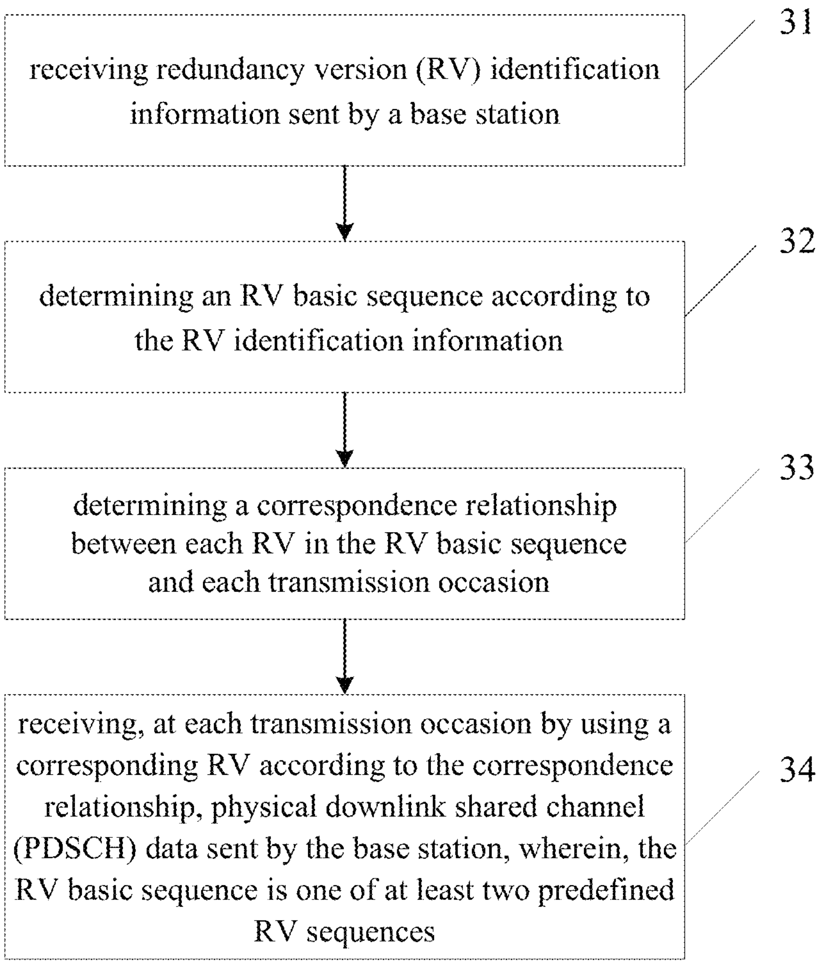
FIG. 3 is a first schematic flowchart of a data transmission method according to some embodiments of the present disclosure.

In view of the problem in the related art of the inability to configure data transmission caused by that the mapping relationship between the RVs transmitted on multiple TRPs/PANELs and the transmission occasions cannot be determined, the present disclosure provides a data transmission method applied to a terminal, as shown in FIG. 3, including:

Step 31: receiving redundancy version (RV) identification information sent by a base station;

Step 32: determining an RV basic sequence according to the RV identification information;

Step 33: determining a correspondence relationship between each RV in the RV basic sequence and each transmission occasion;

Step 34: receiving, at each transmission occasion by using a corresponding RV according to the correspondence relationship, physical downlink shared channel (PDSCH) data sent by the base station;

wherein, the RV basic sequence is one of at least two predefined RV sequences.

Step 33 may also be understood as: determining an RV in the RV basic sequence corresponding to each transmission occasion, and obtaining the correspondence relationship between the transmission occasion and the RV.

By the following steps: receiving redundancy version (RV) identification information sent by a base station; determining an RV basic sequence according to the RV identification information; determining a correspondence relationship between each RV in the RV basic sequence and each transmission occasion; receiving, at each transmission occasion by using a corresponding RV according to the correspondence relationship, physical downlink shared channel (PDSCH) data sent by the base station; wherein, the RV basic sequence is one of at least two predefined RV sequences; the data transmission method provided by some embodiments of the present disclosure can clearly determine the mapping relationship between the RVs and the transmission occasions during coordinated transmission between multiple TRPs/PANELs, and ensure data transmission between the terminal and the base station, thereby solving the problem in the related art of the inability to configure data transmission caused by that the mapping relationship between the RVs transmitted on multiple TRPs/PANELs and the transmission occasions cannot be determined.

Furthermore, before the receiving the redundancy version (RV) identification information sent by the base station, the method further includes: agreeing with the base station on identification information corresponding to each of the at least two RV sequences; wherein, the identification information includes the RV identification information.

Specifically, the determining the correspondence relationship between each RV in the RV basic sequence and each transmission occasion includes: cyclically using each RV in the RV basic sequence in turn as the RV corresponding to each transmission occasion, to obtain the correspondence relationship between each RV in the RV basic sequence and each transmission occasion.

Here, the cyclically using may include two cases:

in the first case, the total number of RVs in the RV basic sequence is greater than or equal to the total number of transmission occasions; in this case, only part of the RVs in the RV basic sequence are used in turn, and it is enough as long as the last mapped RV corresponds to a sending occasion;

in the second case, the total number of RVs in the RV basic sequence is less than the total number of transmission occasions; in this case, part or all of the RVs in the RV basic sequence will be sequentially used multiple times (at least twice), and it is enough as long as the last mapped RV corresponds to a sending occasion;

An example for the above first case is: assuming that the RV basic sequence is S(RV1, RV2, RV3, RV4); the sending occasion includes sending occasion 1, sending occasion 2, sending occasion 3; then the correspondence relationship may be that: the sending occasion 1 corresponds to RV1, the sending occasion 2 corresponds to RV2, the sending occasion 3 corresponds to RV3; or the sending occasion 1 corresponds to RV2, the sending occasion 2 corresponds to RV3, the sending occasion 3 corresponds to RV4; or the sending occasion 1 corresponds to RV3, the sending occasion 2 corresponds to RV4, the sending occasion 3 corresponds to RV1; and so on.

An example for the above second case is: assuming that the RV basic sequence is S(RV1, RV2, RV3); the sending occasion includes sending occasion 1, sending occasion 2, sending occasion 3, sending occasion 4; then the correspondence relationship may be that: the sending occasion 1 corresponds to RV1, the sending occasion 2 corresponds to RV2, the sending occasion 3 corresponds to RV3, the sending occasion 4 corresponds to RV1; or the sending occasion 1 corresponds to RV2, the sending occasion 2 corresponds to RV3, the sending occasion 3 corresponds to RV1, the sending occasion 4 corresponds to RV2; and so on.

As for the cycle, it can be in any cyclic order, such as sequential order or reverse order, which is not limited here. The sequence length of RV can be 4, but it is not limited to this.

In addition, some embodiments of the present disclosure are not limited to this determination method of the correspondence relationship, but may also be any other determination method, as long as the last mapped RV corresponds to one transmission occasion, which is not limited here.

As for "the cyclically using each RV in the RV basic sequence in turn as the RV corresponding to each transmission occasion", two examples are provided as follows:

in the first example, the cyclically using each RV in the RV basic sequence in turn as the RV corresponding to each transmission occasion includes: starting from a first RV in the RV basic sequence, sequentially and cyclically using each RV in the RV basic sequence in turn as the RV corresponding to each transmission occasion.

Specifically, the starting from the first RV in the RV basic sequence, sequentially and cyclically using each RV in the RV basic sequence in turn as the RV corresponding to each transmission occasion includes: in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence; where $1 \leqslant n \leqslant q$, and n is an integer.

As for the above expression "the RV corresponding to the n-th transmission occasion is determined by the . . . value in the RV basic sequence", it can also be understood as "determining the RV corresponding to the n-th transmission occasion according to the . . . value in the RV basic sequence".

In the second example, the cyclically using each RV in the RV basic sequence in turn as the RV corresponding to each transmission occasion includes: starting from an RV corresponding to an RV index, sequentially and cyclically using each RV in the RV basic sequence in turn as the RV corresponding to each transmission occasion.

Specifically, the starting from the RV corresponding to the RV index, sequentially and cyclically using each RV in the RV basic sequence in turn as the RV corresponding to each transmission occasion includes: an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

RV index=0 corresponds to the first RV version in the RV basic sequence.

As for the above expression "the RV corresponding to the n-th transmission occasion is determined by the . . . value in the RV basic sequence", it can also be understood as "determining the RV corresponding to the n-th transmission occasion according to the . . . value in the RV basic sequence".

Furthermore, before the determining the correspondence relationship between each RV in the RV basic sequence and each transmission occasion, the method further includes: agreeing with the base station on the RV index; or receiving the RV index sent by the base station.

As for the "agreeing with the base station on the RV index", it can be specifically implemented as: directly agreeing to use which RV in the RV basic sequence to correspond to an RV index (it can also correspond to different RVs according to different situations); it can also be implemented as: agreeing on starting using which RV to correspond to an RV index; which is not limited here.

Considering the independent mapping relationships between different RV sequences and TRPs, in some embodiments of the present disclosure, the RV index may include a first RV sub-index corresponding to a first transmission configuration indication state (TCI state) and a second RV sub-index corresponding to a second TCI state.

Wherein, in a case that there is lack of information or omission of information for the first RV sub-index, the first RV sub-index is the same as the second RV sub-index; in a case that there is lack of information or omission of information for the second RV sub-index, the second RV sub-index is the same as the first RV sub-index.

Considering the independent mapping relationships between different RV sequences and TRPs, in some embodiments of the present disclosure, the RV identification information may include a first sub-identification information corresponding to a first transmission configuration indication state (TCI state) and a second sub-identification information corresponding to a second TCI state.

Accordingly, the determining the RV basic sequence according to the RV identification information includes: determining a first RV basic sequence corresponding to the first TCI state according to the first sub-identification information; and determining a second RV basic sequence corresponding to the second TCI state according to the second sub-identification information;

- the determining the correspondence relationship between each RV in the RV basic sequence and each transmission occasion includes: determining a first correspondence relationship between each RV in the first RV basic sequence and each transmission occasion corresponding to the first TCI state; and determining a second correspondence relationship between each RV in the second RV basic sequence and each transmission occasion corresponding to the second TCI state.

Wherein, in a case that there is lack of information or omission of information for the first sub-identification information, the first sub-identification information is the same as the second sub-identification information; in a case that there is lack of information or omission of information for the second sub-identification information, the second sub-identification information is the same as the first sub-identification information.

The transmission occasion may also be configured by the base station, but it is not limited here.

The above information sent by the base station and received by the terminal may be issued through high-level signaling, or may be issued through downlink control information (DCI), which is not limited here.

Figure 4:
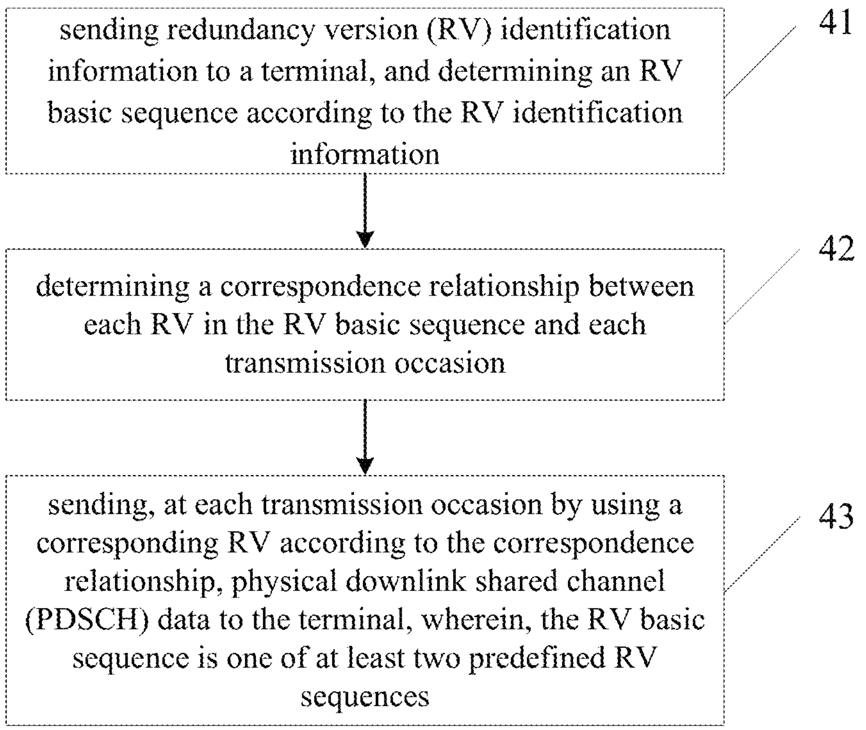
FIG. 4 is a second schematic flowchart of a data transmission method according to some embodiments of the present disclosure.

Some embodiments of the present disclosure further provide a data transmission method applied to a base station, as shown in FIG. 4, including:

- Step 41: sending redundancy version (RV) identification information to a terminal, and determining an RV basic sequence according to the RV identification information;
- Step 42: determining a correspondence relationship between each RV in the RV basic sequence and each transmission occasion;
- Step 43: sending, at each transmission occasion by using a corresponding RV according to the correspondence relationship, physical downlink shared channel (PDSCH) data to the terminal;
- wherein, the RV basic sequence is one of at least two predefined RV sequences.

Step 42 may also be understood as: determining an RV in the RV basic sequence corresponding to each transmission occasion, and obtaining the correspondence relationship between the transmission occasion and the RV.

By the following steps: sending redundancy version (RV) identification information to a terminal, and determining an RV basic sequence according to the RV identification information; determining a correspondence relationship between each RV in the RV basic sequence and each transmission occasion; sending, at each transmission occasion by using a corresponding RV according to the correspondence relationship, physical downlink shared channel (PDSCH) data to the terminal; wherein, the RV basic sequence is one of at least two predefined RV sequences; the data transmission method provided by some embodiments of the present disclosure can clearly determine the mapping relationship between the RVs and the transmission occasions during coordinated transmission between multiple TRPs/PANELs, and ensure data transmission between the terminal and the base station, thereby solving the problem in the related art of the inability to configure data transmission caused by that the mapping relationship between the RVs transmitted on multiple TRPs/PANELs and the transmission occasions cannot be determined.

Furthermore, before the sending the redundancy version (RV) identification information to the terminal, the method further includes: agreeing with the terminal on identification information corresponding to each of the at least two RV sequences; wherein, the identification information includes the RV identification information.

Specifically, the determining the correspondence relationship between each RV in the RV basic sequence and each transmission occasion includes: cyclically using each RV in the RV basic sequence in turn as the RV corresponding to each transmission occasion, to obtain the correspondence relationship between each RV in the RV basic sequence and each transmission occasion.

Here, the cyclically using may include two cases:

- in the first case, the total number of RVs in the RV basic sequence is greater than or equal to the total number of transmission occasions; in this case, only part of the RVs in the RV basic sequence are used in turn, and it is enough as long as the last mapped RV corresponds to a sending occasion;
- in the second case, the total number of RVs in the RV basic sequence is less than the total number of transmission occasions; in this case, part or all of the RVs in the RV basic sequence will be sequentially used multiple times (at least twice), and it is enough as long as the last mapped RV corresponds to a sending occasion;

An example for the above first case is: assuming that the RV basic sequence is S(RV1, RV2, RV3, RV4); the sending occasion includes sending occasion 1, sending occasion 2, sending occasion 3; then the correspondence relationship may be that: the sending occasion 1 corresponds to RV1, the sending occasion 2 corresponds to RV2, the sending occasion 3 corresponds to RV3; or

- the sending occasion 1 corresponds to RV2, the sending occasion 2 corresponds to RV3, the sending occasion 3 corresponds to RV4; or
- the sending occasion 1 corresponds to RV3, the sending occasion 2 corresponds to RV4, the sending occasion 3 corresponds to RV1; and so on.

An example for the above second case is: assuming that the RV basic sequence is S(RV1, RV2, RV3); the sending occasion includes sending occasion 1, sending occasion 2, sending occasion 3, sending occasion 4; then the correspondence relationship may be that: the sending occasion 1 corresponds to RV1, the sending occasion 2 corresponds to RV2, the sending occasion 3 corresponds to RV3, the sending occasion 4 corresponds to RV1; or the sending occasion 1 corresponds to RV2, the sending occasion 2 corresponds to RV3, the sending occasion 3 corresponds to RV1, the sending occasion 4 corresponds to RV2; and so on.

As for the cycle, it can be in any cyclic order, such as sequential order or reverse order, which is not limited here. The sequence length of RV can be 4, but it is not limited to this.

In addition, some embodiments of the present disclosure are not limited to this determination method of the correspondence relationship, but may also be any other determination method, as long as the last mapped RV corresponds to one transmission occasion, which is not limited here.

As for "the cyclically using each RV in the RV basic sequence in turn as the RV corresponding to each transmission occasion", two examples are provided as follows:

in the first example, the cyclically using each RV in the RV basic sequence in turn as the RV corresponding to each transmission occasion includes: starting from a first RV in the RV basic sequence, sequentially and cyclically using each RV in the RV basic sequence in turn as the RV corresponding to each transmission occasion.

Specifically, the starting from the first RV in the RV basic sequence, sequentially and cyclically using each RV in the RV basic sequence in turn as the RV corresponding to each transmission occasion includes: in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence; where $1 \leqslant n \leqslant q$, and n is an integer.

As for the above expression "the RV corresponding to the n-th transmission occasion is determined by the . . . value in the RV basic sequence", it can also be understood as "determining the RV corresponding to the n-th transmission occasion according to the . . . value in the RV basic sequence".

In the second example, the cyclically using each RV in the RV basic sequence in turn as the RV corresponding to each transmission occasion includes: starting from an RV corresponding to an RV index, sequentially and cyclically using each RV in the RV basic sequence in turn as the RV corresponding to each transmission occasion.

Specifically, the starting from the RV corresponding to the RV index, sequentially and cyclically using each RV in the RV basic sequence in turn as the RV corresponding to each transmission occasion includes: an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

RV index=0 corresponds to the first RV version in the RV basic sequence.

As for the above expression "the RV corresponding to the n-th transmission occasion is determined by the . . . value in the RV basic sequence", it can also be understood as "determining the RV corresponding to the n-th transmission occasion according to the . . . value in the RV basic sequence".

Furthermore, before the determining the correspondence relationship between each RV in the RV basic sequence and each transmission occasion, the method further includes: agreeing with the terminal on the RV index; or sending the RV index to the terminal.

As for the "agreeing with the terminal on the RV index", it can be specifically implemented as: directly agreeing to use which RV in the RV basic sequence to correspond to an RV index (it can also correspond to different RVs according to different situations); it can also be implemented as: agreeing on starting using which RV to correspond to an RV index; which is not limited here.

Considering the independent mapping relationships between different RV sequences and TRPs, in some embodiments of the present disclosure, the RV index may include a first RV sub-index corresponding to a first transmission configuration indication state (TCI state) and a second RV sub-index corresponding to a second TCI state.

Wherein, in a case that there is lack of information or omission of information for the first RV sub-index, the first RV sub-index is the same as the second RV sub-index; in a case that there is lack of information or omission of information for the second RV sub-index, the second RV sub-index is the same as the first RV sub-index.

Considering the independent mapping relationships between different RV sequences and TRPs, in some embodiments of the present disclosure, the RV identification information includes a first sub-identification information corresponding to a first transmission configuration indication state (TCI state) and a second sub-identification information corresponding to a second TCI state.

Accordingly, the determining the RV basic sequence according to the RV identification information includes: determining a first RV basic sequence corresponding to the first TCI state according to the first sub-identification information; and determining a second RV basic sequence corresponding to the second TCI state according to the second sub-identification information;

the determining the correspondence relationship between each RV in the RV basic sequence and each transmission occasion includes: determining a first correspondence relationship between each RV in the first RV basic sequence and each transmission occasion corresponding to the first TCI state; and determining a second correspondence relationship between each RV in the second RV basic sequence and each transmission occasion corresponding to the second TCI state.

Wherein, in a case that there is lack of information or omission of information for the first sub-identification information, the first sub-identification information is the same as the second sub-identification information; in a case that there is lack of information or omission of information for the second sub-identification information, the second sub-identification information is the same as the first sub-identification information.

The transmission occasion may also be configured by the base station, but it is not limited here.

The above information sent by the base station to the terminal may be issued through high-level signaling, or may be issued through downlink control information (DCI), which is not limited here.

The data transmission method provided by some embodiments of the present disclosure will be further described below in conjunction with the terminal side and the base station side.

In view of the above technical problem, some embodiments of the present disclosure provide a data transmission method, which can achieve an improved transmission reliability by further using resource interleaving mapping method under the transmission scheme that uses the TDM method to support reliability, during the coordinated transmission between multiple TRPs/PANELs.

Specifically, the following examples illustrates the method of making an RV correspond to different time-domain transmission occasions (supporting transmission of mini-slot or slot). As for the cyclical using each RV in the RV basic sequence, the following takes sequential cycle as an example:

Example 1-1: an RV sequence set {s1, s2, . . . , sm} used for single TRP transmission is predefined, including m RV sequences of length k. It is assumed that k is 4, e.g., each RV sequence is s{rv1, rv2, rv3, rv4}, which may be one of {0, 2, 3, 1}, {0, 3, 0, 3}, {0, 2, 0, 2}, . . . , {0, 0, 0, 0}.

(1) The base station indicates the sequence numbers (i.e., REP_RV1 and REP_RV2) of two RV sequences to the terminal through high-level signaling or DCI signaling, respectively, which correspond to the RV basic sequences used by the TRPs of TCI state 0 and TCI state 1, respectively. For example, the high-level signaling indication method can be as follows:

REP-RV1 ENUMERATED {s1-0231, s2-0303, . . . , sn-0000} OPTIONAL, —Need R

REP-RV2 ENUMERATED {s1-0231, s2-0303, . . . , sn-0000} OPTIONAL, —Need R

Both the base station and the terminal can determine the RV basic version indicated by the high-level signaling according to the preset correspondence relationship. For example, when REP_RV1 indicates 0, then {0, 2, 3, 1} is specifically selected as the RV basic sequence of TCI state 0, which is the same for RV2.

If the signaling indicates that REP_RV2 or REP_RV1 is default, and two TCI states are actually configured, it can be assumed that REP_RV2 and REP_RV1 are the same.

(2) The base station or the terminal obtains the actual RV sequence (that is, RV1 and RV2) corresponding to different TCI state transmissions through the RV basic sequence, and needs to know the starting location in the RV sequence, so as to cyclically map to the corresponding transmission occasion of the corresponding TCI state. Specifically, the following method can be used:

a) The base station and the terminal agree that the first transmission starts at the sequence location associated with rv=X in the cycle and begins to cycle the rv transmission sequence. For example, if X=0, the defined RV basic sequence is {3, 1, 0, 2}, then the actual transmission sequence is {0, 2, 3, 1};

b) The base station indicates the initially sent RV index 1 and RV index 2 to the terminal through high-level signaling or DCI bit, and the actual RV sequence starts to circulate from the RV index location. For example, the basic sequence is indicated as {0, 2, 3, 1} and index=1, then the actual RV sequence is {2, 3, 1, 0} (the value bit of index is an integer greater than or equal to 0 and less than or equal to 3);

If the signaling indicates that RV index 2 is default, it can be assumed that the two RV indexes are the same.

(3) The base station or the terminal can send the sequences RV1 and RV2 through the obtained RV, respectively map RV1 to the transmission occasion corresponding to TCI state 0 in the K transmission occasions, and sequentially and cyclically use the rv1 #n version corresponding to RV1 (each version in the RV1 sequence), and map RV2 to the transmission occasion corresponding to TCI state 1 in the K transmission occasions, and sequentially and cyclically use the rv2 #n version corresponding to RV2.

Specifically, the rv associated with the n-th (n=1, 2, . . . , K) transmission occasion can be determined by the [mod (n−1, 4)+RV index+1]-th value in the corresponding REP_RV sequence.

The base station and the terminal can use the same method to acknowledge the correspondence relationship between the RV and the transmission occasion, which will not be repeated here.

Example 1-2: an RV sequence set {s1, s2, . . . , sm} used for single TRP transmission is predefined, including m RV sequences of length k. It is assumed that k is 4, e.g., each RV sequence is s{rv1, rv2, rv3, rv4}, which may be one of {0, 2, 3, 1}, {2, 3, 1, 0}, {3, 1, 0, 2}, {1, 0, 2, 3}, {0, 3, 0, 3}, {0, 2, 0, 2}, . . . {0, 0, 0, 0}, that is, it may contain different versions of the cycles of the same RV basic sequence itself.

(1) The base station indicates the sequence numbers (i.e., REP_RV1 and REP_RV2) of two RV sequences to the terminal through high-level signaling or DCI signaling, respectively, which correspond to the RV basic sequences used by the TRPs of TCI state 0 and TCI state 1, respectively.

If the signaling indicates that REP_RV2 is default, and two TCI states are actually configured, it can be assumed that REP_RV2 is the same as REP_RV1.

(2) The RVs indicated by the signaling (i.e., REP_RV1 and REP_RV2) are directed used, and their respective TCI states are sequentially and cyclically mapped to K transmission occasions.

In this way, the RV sequences of different TRPs correspond to their respective time-domain transmission occasions, respectively. Considering the continuity of the fading channel experienced by a same TRP, it can achieve the optimal transmission of the RV sequence on each TRP, which is beneficial to obtaining higher combining gain.

Assuming that 4 is less than K, the rv associated with the n-th (n=1, 2, . . . , K) transmission occasion can be determined by the [mod(n−1, 4)+1]-th value in the corresponding REP_RV sequence.

The base station and the terminal can use the same method to acknowledge the correspondence relationship between the RV and the transmission occasion, which will not be repeated here.

If the independent mapping relationship between different RV sequences and TRPs is not considered (that is, the TCI state is not considered), then the method of making RVs correspond to different time-domain transmission occasions is as follows:

Examples 2-1: an RV sequence set {s1, s2, . . . , sm} used for single TRP transmission is predefined, including m RV sequences of length k. It is assumed that k is 4, e.g., each RV sequence is s{rv1, rv2, rv3, rv4}, which may be one of {0, 2, 3, 1}, {0, 3, 0, 3}, {0, 2, 0, 2}, . . . , {0, 0, 0, 0}.

(1) The base station can notify the terminal to select a sequence number of an RV sequence, that is, REP_RV, through high-layer signaling or DCI signaling.

(2) The base station can configure a sequence number of a cycle starting location, that is, the RV index, to the terminal through high-level signaling or DCI signaling.

(3) The terminal can cyclically use the RV sequence values starting from the RV index within K transmission occasions configured by the base station through high-level signaling, and the rv associated with the n-th (n=1, 2, . . . , K) transmission occasion can be determined by the [mod (n−1, 4)+RV index+1]-th value in the configured REP_RV sequence. The symbol "mod" represents remainder operation.

The base station and the terminal can use the same method to acknowledge the correspondence relationship between the RV and the transmission occasion, which will not be repeated here.

Example 2-2: an RV sequence set {s1, s2, . . . , sm} used for single TRP transmission is predefined, including m RV sequences of length k. It is assumed that k is 4, e.g., each RV sequence is s{rv1, rv2, rv3, rv4}, which may be one of {0, 2, 3, 1}, {2, 3, 1, 0}, {3, 1, 0, 2}, {1, 0, 2, 3}, {0, 3, 0, 3}, {0, 2, 0, 2}, . . . {0, 0, 0, 0}, that is, it may contain different versions of the cycles of the same RV basic sequence itself.

(1) The base station can notify the terminal to select a sequence number of an RV sequence, that is, REP_RV, through high-layer signaling or DCI signaling.

(2) The terminal can cyclically use the RV sequence values starting from the RV index within K transmission occasions configured by the base station through high-level signaling. Assuming that 4 is less than K, the rv associated with the n-th (n=1, 2, . . . , K) transmission occasion can be determined by the [mod(n−1, 4)+1]-th value in the configured REP_RV sequence.

The base station and the terminal can use the same method to acknowledge the correspondence relationship between the RV and the transmission occasion, which will not be repeated here.

Example 3-1: an RV sequence set {s1, s2, . . . , sm} used for two TRP transmissions that are coordinated is predefined, including m RV sequences of length k. It is assumed that k is greater than or equal to K, K rvs can correspond to K transmission occasions one-to-one.

(1) The base station can notify the terminal to select a sequence number of an RV sequence, that is, REP_RV, through high-layer signaling or DCI signaling.

(2) The terminal can map the RV sequence values corresponding to REP_RVs one-to-one within K transmission occasions configured by the base station through high-level signaling. The rv associated with the n-th (n=1, 2, . . . , K) transmission occasion can be determined by the n-th value in the configured REP_RV sequence.

The base station and the terminal can use the same method to acknowledge the correspondence relationship between the RV and the transmission occasion, which will not be repeated here.

Example 3-2: an RV sequence set {s1, s2, . . . , sm} used for two TRP transmissions that are coordinated is predefined, including m RV sequences of length k. It is assumed that k is greater than or equal to K, K rvs can correspond to K transmission occasions one-to-one.

(1) The base station can notify the terminal to select a sequence number of an RV sequence, that is, REP_RV, through high-layer signaling or DCI signaling.

(2) The base station can configure a sequence number of a cycle starting location, that is, the RV index, to the terminal through high-level signaling or DCI signaling.

(3) The terminal can cyclically use the RV sequence values starting from the RV index within K transmission occasions configured by the base station through high-level signaling, and map them one-to-one with the RV sequence value corresponding to REP_RV. Specifically, the rv associated with the n-th (n=1, 2, . . . , K) transmission occasion can be determined by the [mod(n−1, 4)+RV index+1]-th value in the configured REP_RV sequence.

The base station and the terminal can use the same method to acknowledge the correspondence relationship between the RV and the transmission occasion, which will not be repeated here.

The corresponding relationship between TCI states and transmission occasions in the above examples 1-1 and 1-2 is introduced as follows:

As for the TDM transmission mode of a single TRP, a same transport block (TB block) is repeatedly sent at multiple times (min-slots/slots), and different transmission occasions can correspond to the same or different RVs (redundancy versions) of the same TB block. The receiving end (the terminal) needs to perform soft combining for the same or different RV versions before decoding, so as to obtain a higher coding gain.

Figure 1:
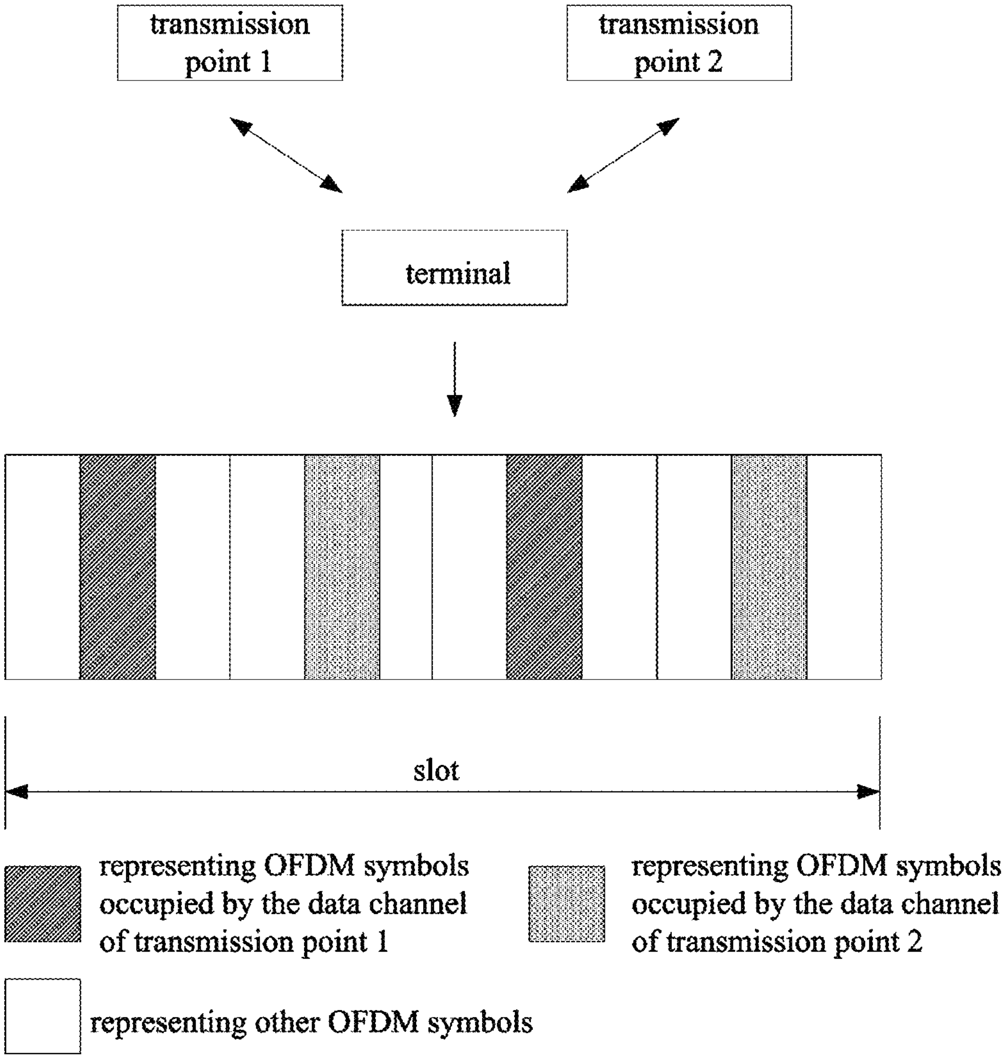
FIG. 1 is a schematic diagram of URLLC enhancement scheme 3 for coordinated multi-point transmission in the related art.
Figure 2:
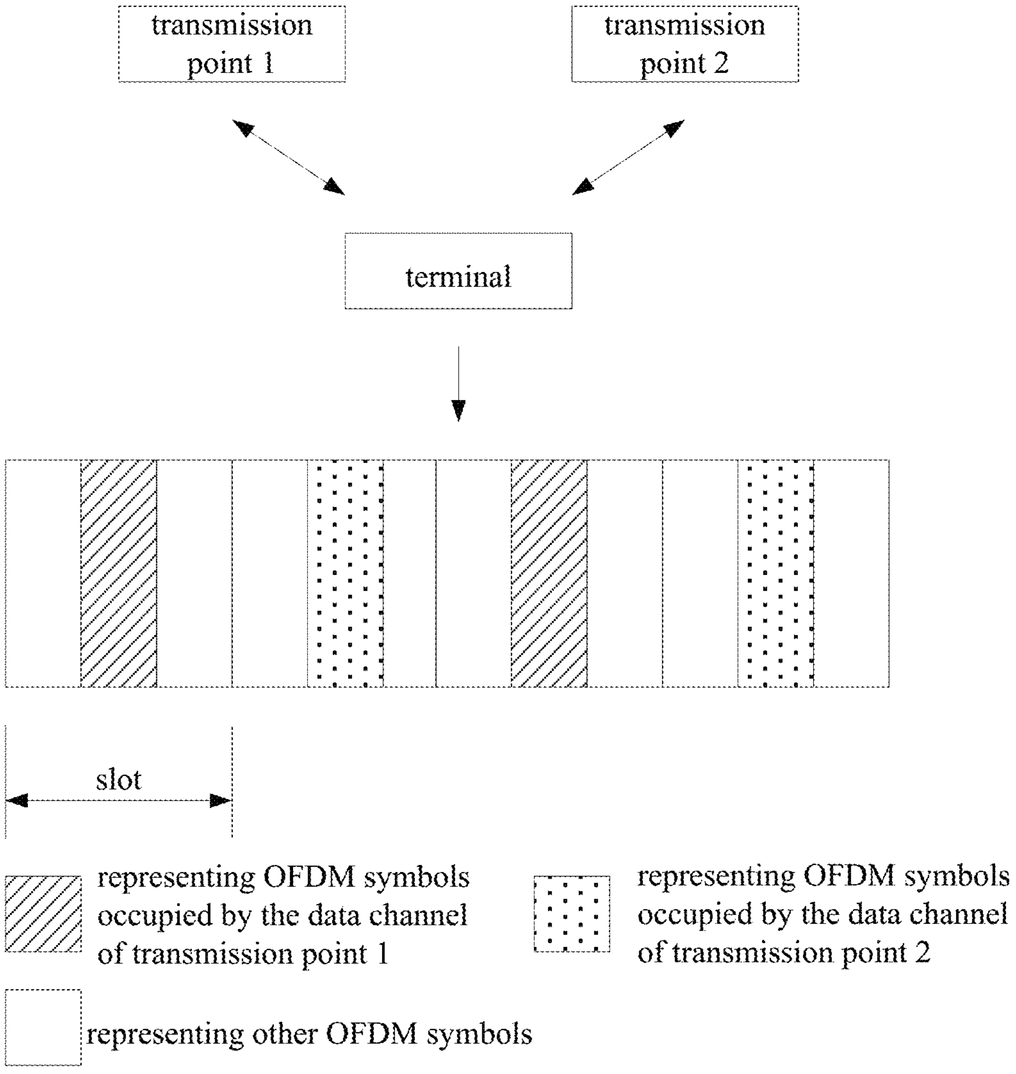
FIG. 2 is a schematic diagram of URLLC enhancement scheme 4 for coordinated multi-point transmission in the related art.

Assuming that the network side (the base station) indicates or configures the number of time domain repetitions as M (as for the scheme 3 shown in FIG. 1, corresponding to M mini-slots; as for the scheme 4 shown in FIG. 2, corresponding to M slots), QCL corresponding to DMRS is given by TCI codepoint (indication information), which corresponds to 1 or 2 TCI states, and 2 TCI states correspond to different beam direction indications, respectively (it can refer to different beam direction indications of the same TRP, or it can refer to the beam direction indications of different TRPs, and one TCI state indicates beam transmission on one TRP). When the indication corresponding to the TCI codepoint contains only one TCI state, it can be either TCI state 0 or TCI state 1; when it contains two TCI states (both TCI state 0 and TCI state 1), it can simultaneously indicate TCI states from beam directions of two TRPs. The TCI states can correspond to different transmission occasions in the time domain by a certain method, for example:

Method I: indicating the sequence numbers of the corresponding TCI sequences in the TCI sequence table by a bitmap with a length of S or high-level signaling, so as to achieve a one-to-one mapping with the transmission occasions on the time domain.

Method 2: defining the correspondence between TCI states and time domain transmission occasions in a predefinition manner. For example, it can be agreed that TCI state 0 corresponds to an even-numbered mini-slot or slot, and TCI state 1 corresponds to an odd-numbered mini-slot or slot; it can be agreed that TCI state 0 corresponds to the first half of the mini-slots or slots, and TCI state 1 corresponds to the second half of the mini-slots or slots. After determining the number of repetitions N (less than or equal to M), the network side can determine the corresponding relationship between the TCI state and each mini-slot or slot through the above agreement.

Through the above indications, the specific correspondence relationship between the time domain transmission occasion and the TCI state indicated by QCL can be obtained, that is, the TCI state sequence corresponding to the transmission occasion {T1, T2, . . . , Tk} is {TCI state (T1), TCI state (T2), . . . , TCI state (Tk)}; for example, M=4, and when TRP is transmitted in the transmission occasion in an odd-even interleaved manner, the TCI state sequence corresponding to the transmission occasion {T0, T1, T2, T3} is {TCI state 0, TCI state 1, TCI state 0, TCI state 1}.

It can be seen from the above that the solutions provided by some embodiments of the present disclosure can associate different transmission occasions with the used RV versions. The association method can consider the independent mapping of individual TRPs, or the joint mapping of RV versions between TRPs; therefore, in the TDM reliability enhancement scheme for multi-point transmission (scheme 3 shown in FIG. 1 or scheme 4 shown in FIG. 2), it is possible to determine the association relationship between the RV versions used for different transmission occasions, as well as the corresponding relationship between the TCI states and mini slots or slots, ensuring the data transmission between the base station and the terminal.

Figure 5:
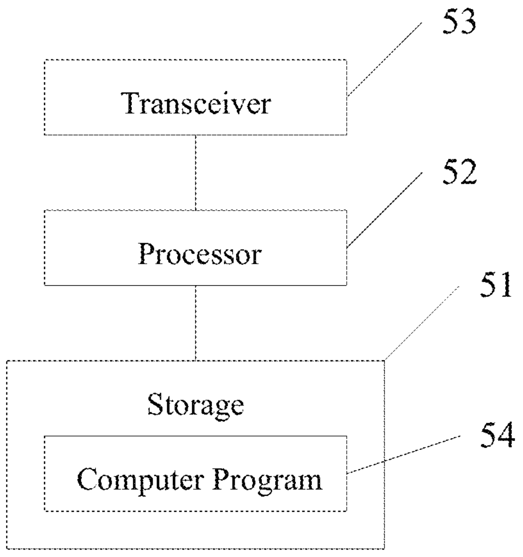
FIG. 5 is a structural diagram of a terminal according to some embodiments of the present disclosure.

Some embodiments of the present disclosure also provide a terminal, as shown in FIG. 5, including a storage 51, a processor 52, a transceiver 53, and a computer program 54 stored on the storage 51 and capable of being executed by the processor 52; the processor 52 implements the following steps when executing the program:

receiving by the transceiver 53 redundancy version (RV) identification information sent by a base station;

determining an RV basic sequence according to the RV identification information;

determining a correspondence relationship between each RV in the RV basic sequence and each transmission occasion;

receiving by the transceiver 53, at each transmission occasion by using a corresponding RV according to the correspondence relationship, physical downlink shared channel (PDSCH) data sent by the base station;

wherein, the RV basic sequence is one of at least two predefined RV sequences.

Through receiving by the transceiver the redundancy version (RV) identification information sent by a base station; determining an RV basic sequence according to the RV identification information; determining a correspondence relationship between each RV in the RV basic sequence and each transmission occasion; receiving by the transceiver, at each transmission occasion by using a corresponding RV according to the correspondence relationship, physical downlink shared channel (PDSCH) data sent by the base station; wherein, the RV basic sequence is one of at least two predefined RV sequences; the terminal provided by some embodiments of the present disclosure can clearly determine the mapping relationship between the RVs and the transmission occasions during coordinated transmission between multiple TRPs/PANELs, and ensure data transmission between the terminal and the base station, thereby solving the problem in the related art of the inability to configure data transmission caused by that the mapping relationship between the RVs transmitted on multiple TRPs/PANELs and the transmission occasions cannot be determined.

Furthermore, the processor is further configured to: agree with the base station on identification information corresponding to each of the at least two RV sequences before receiving the redundancy version (RV) identification information sent by the base station; wherein, the identification information includes the RV identification information.

Specifically, the processor is specifically configured to: cyclically use each RV in the RV basic sequence in turn as the RV corresponding to each transmission occasion, to obtain the correspondence relationship between each RV in the RV basic sequence and each transmission occasion.

As for "the cyclically using each RV in the RV basic sequence in turn as the RV corresponding to each transmission occasion", two examples are provided as follows:

in the first example, the processor is specifically configured to: starting from a first RV in the RV basic sequence, sequentially and cyclically use each RV in the RV basic sequence in turn as the RV corresponding to each transmission occasion.

Specifically, the starting from the first RV in the RV basic sequence, sequentially and cyclically using each RV in the RV basic sequence in turn as the RV corresponding to each transmission occasion includes: in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence; where $1 \leq n \leq q$, and n is an integer.

In the second example, the processor is specifically configured to: starting from an RV corresponding to an RV index, sequentially and cyclically use each RV in the RV basic sequence in turn as the RV corresponding to each transmission occasion.

Specifically, the starting from the RV corresponding to the RV index, sequentially and cyclically using each RV in the RV basic sequence in turn as the RV corresponding to each transmission occasion includes: an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Furthermore, the processor is specifically configured to: before the determining the correspondence relationship between each RV in the RV basic sequence and each transmission occasion, agree with the base station on the RV index; or receive by the transceiver the RV index sent by the base station.

Considering the independent mapping relationships between different RV sequences and TRPs, in some embodiments of the present disclosure, the RV index includes a first RV sub-index corresponding to a first transmission configuration indication state (TCI state) and a second RV sub-index corresponding to a second TCI state.

Wherein, in a case that there is lack of information or omission of information for the first RV sub-index, the first RV sub-index is the same as the second RV sub-index; in a case that there is lack of information or omission of information for the second RV sub-index, the second RV sub-index is the same as the first RV sub-index.

Considering the independent mapping relationships between different RV sequences and TRPs, in some embodiments of the present disclosure, the RV identification information includes a first sub-identification information corresponding to a first transmission configuration indication state (TCI state) and a second sub-identification information corresponding to a second TCI state.

Accordingly, the processor is specifically configured to: determine a first RV basic sequence corresponding to the first TCI state according to the first sub-identification information; and determine a second RV basic sequence corresponding to the second TCI state according to the second sub-identification information;

the processor is specifically configured to: determine a first correspondence relationship between each RV in the first RV basic sequence and each transmission occasion corresponding to the first TCI state; and determining a second correspondence relationship between each RV in the second RV basic sequence and each transmission occasion corresponding to the second TCI state.

Wherein, in a case that there is lack of information or omission of information for the first sub-identification information, the first sub-identification information is the same as the second sub-identification information; in a case that there is lack of information or omission of information for the second sub-identification information, the second sub-identification information is the same as the first sub-identification information.

The transmission occasion may also be configured by the base station, but it is not limited here.

The above information sent by the base station and received by the terminal may be issued through high-level signaling, or may be issued through downlink control information (DCI), which is not limited here.

Wherein the foregoing embodiments implemented by the data transmission method on the terminal side are all applicable to the embodiments of the terminal, and the same technical effect can also be achieved.

Figure 6:
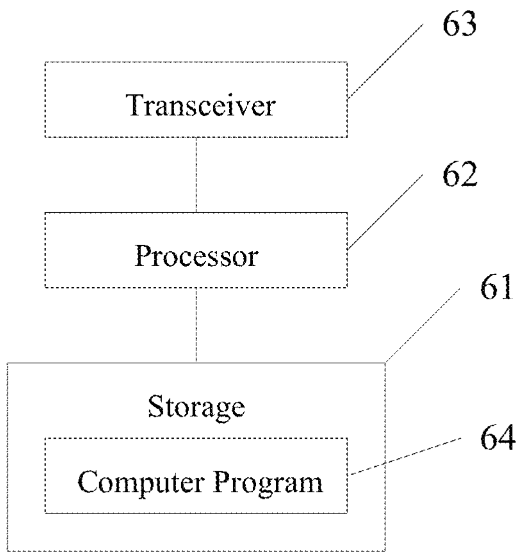
FIG. 6 is a structural diagram of a base station according to some embodiments of the present disclosure.

Some embodiments of the present disclosure further provide a base station, as shown in FIG. 6, including a storage 61, a processor 62, a transceiver 63, and a computer program 64 stored in the storage 61 and capable of being executed by the processor 62; wherein, the processor 62 implements the following steps when executing the program:

sending redundancy version (RV) identification information to a terminal by the transceiver 63, and determining an RV basic sequence according to the RV identification information;

determining a correspondence relationship between each RV in the RV basic sequence and each transmission occasion;

sending, at each transmission occasion by using a corresponding RV according to the correspondence relationship, physical downlink shared channel (PDSCH) data to the terminal by the transceiver 63;

wherein, the RV basic sequence is one of at least two predefined RV sequences.

Through sending redundancy version (RV) identification information to a terminal by the transceiver, and determining an RV basic sequence according to the RV identification information; determining a correspondence relationship between each RV in the RV basic sequence and each transmission occasion; sending, at each transmission occasion by using a corresponding RV according to the correspondence relationship, physical downlink shared channel (PDSCH) data to the terminal by the transceiver; wherein, the RV basic sequence is one of at least two predefined RV sequences; the base station provided by some embodiments of the present disclosure can clearly determine the mapping relationship between the RVs and the transmission occasions during coordinated transmission between multiple TRPs/PANELs, and ensure data transmission between the terminal and the base station, thereby solving the problem in the related art of the inability to configure data transmission caused by that the mapping relationship between the RVs transmitted on multiple TRPs/PANELs and the transmission occasions cannot be determined.

Furthermore, the processor is further configured to: agree with the terminal on identification information corresponding to each of the at least two RV sequences, before the sending the redundancy version (RV) identification information to the terminal; wherein, the identification information includes the RV identification information.

Specifically, the processor is specifically configured to: cyclically use each RV in the RV basic sequence in turn as the RV corresponding to each transmission occasion, to obtain the correspondence relationship between each RV in the RV basic sequence and each transmission occasion.

As for "the cyclically using each RV in the RV basic sequence in turn as the RV corresponding to each transmission occasion", two examples are provided as follows:

in the first example, the processor is specifically configured to: starting from a first RV in the RV basic sequence, sequentially and cyclically use each RV in the RV basic sequence in turn as the RV corresponding to each transmission occasion.

Specifically, the starting from the first RV in the RV basic sequence, sequentially and cyclically using each RV in the RV basic sequence in turn as the RV corresponding to each transmission occasion includes: in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence; where $1 \leqslant n \leqslant q$, and n is an integer.

In the second example, the processor is specifically configured to: starting from an RV corresponding to an RV index, sequentially and cyclically use each RV in the RV basic sequence in turn as the RV corresponding to each transmission occasion.

Specifically, the starting from the RV corresponding to the RV index, sequentially and cyclically using each RV in the RV basic sequence in turn as the RV corresponding to each transmission occasion includes: an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Furthermore, the processor is specifically configured to: before the determining the correspondence relationship between each RV in the RV basic sequence and each transmission occasion, agree with the terminal on the RV index; or sending the RV index by the transceiver to the terminal.

Considering the independent mapping relationships between different RV sequences and TRPs, in some embodiments of the present disclosure, the RV index includes a first RV sub-index corresponding to a first transmission configuration indication state (TCI state) and a second RV sub-index corresponding to a second TCI state.

Wherein, in a case that there is lack of information or omission of information for the first RV sub-index, the first RV sub-index is the same as the second RV sub-index; in a case that there is lack of information or omission of information for the second RV sub-index, the second RV sub-index is the same as the first RV sub-index.

Considering the independent mapping relationships between different RV sequences and TRPs, in some embodiments of the present disclosure, the RV identification information includes a first sub-identification information corresponding to a first transmission configuration indication state (TCI state) and a second sub-identification information corresponding to a second TCI state.

Accordingly, the processor is specifically configured to: determine a first RV basic sequence corresponding to the first TCI state according to the first sub-identification information; and determine a second RV basic sequence corresponding to the second TCI state according to the second sub-identification information;

- the processor is specifically configured to: determine a first correspondence relationship between each RV in the first RV basic sequence and each transmission occasion corresponding to the first TCI state; and determine a second correspondence relationship between each RV in the second RV basic sequence and each transmission occasion corresponding to the second TCI state.

Wherein, in a case that there is lack of information or omission of information for the first sub-identification information, the first sub-identification information is the same as the second sub-identification information; in a case that there is lack of information or omission of information for the second sub-identification information, the second sub-identification information is the same as the first sub-identification information.

The transmission occasion may also be configured by the base station, but it is not limited here.

The above information sent by the base station to the terminal may be issued through high-level signaling, or may be issued through downlink control information (DCI), which is not limited here.

Wherein the foregoing embodiments implemented by the data transmission method on the base station side are all applicable to the embodiments of the base station, and the same technical effect can also be achieved.

Some embodiments of the present disclosure further provide a computer readable storage medium having a computer program stored therein, the computer program implementing, when executed by a processor, the steps of the above data transmission method on the terminal side; or

- the computer program implementing, when executed by a processor, the steps of the above data transmission method on the base station side.

Wherein the foregoing embodiments implemented by the data transmission method on the terminal side or the base station side are all applicable to the embodiments of the computer readable storage medium, and the same technical effect can also be achieved.

Figure 7:
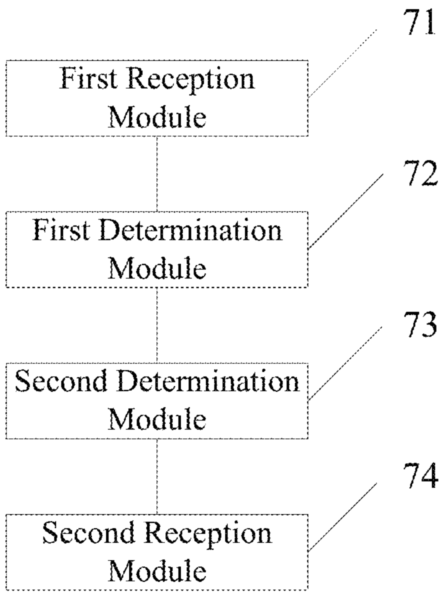
FIG. 7 is a first structural diagram of a data transmission device according to some embodiments of the present disclosure.

Some embodiments of the present disclosure further provides a data transmission device applied to a terminal, as shown in FIG. 7, including:

- a first reception module 71 for receiving redundancy version (RV) identification information sent by a base station;
- a first determination module 72 for determining an RV basic sequence according to the RV identification information;
- a second determination module 73 for determining a correspondence relationship between each RV in the RV basic sequence and each transmission occasion;
- a second reception module 74 for receiving, at each transmission occasion by using a corresponding RV according to the correspondence relationship, physical downlink shared channel (PDSCH) data sent by the base station;
- wherein, the RV basic sequence is one of at least two predefined RV sequences.

Through receiving redundancy version (RV) identification information sent by a base station; determining an RV basic sequence according to the RV identification information; determining a correspondence relationship between each RV in the RV basic sequence and each transmission occasion; receiving, at each transmission occasion by using a corresponding RV according to the correspondence relationship, physical downlink shared channel (PDSCH) data sent by the base station; wherein, the RV basic sequence is one of at least two predefined RV sequences; the data transmission device provided by some embodiments of the present disclosure can clearly determine the mapping relationship between the RVs and the transmission occasions during coordinated transmission between multiple TRPs/PANELs, and ensure data transmission between the terminal and the base station, thereby solving the problem in the related art of the inability to configure data transmission caused by that the mapping relationship between the RVs transmitted on multiple TRPs/PANELs and the transmission occasions cannot be determined.

Furthermore, the data transmission device further includes: a first agreement module for agreeing with the base station on identification information corresponding to each of the at least two RV sequences before receiving the redundancy version (RV) identification information sent by the base station; wherein, the identification information includes the RV identification information.

Specifically, the second determination module includes: a first processing sub-module for cyclically using each RV in the RV basic sequence in turn as the RV corresponding to each transmission occasion, to obtain the correspondence relationship between each RV in the RV basic sequence and each transmission occasion.

As for "the cyclically using each RV in the RV basic sequence in turn as the RV corresponding to each transmission occasion", two examples are provided as follows:

- in the first example, the first processing sub-module includes: a first processing unit for starting from a first RV in the RV basic sequence, sequentially and cyclically using each RV in the RV basic sequence in turn as the RV corresponding to each transmission occasion.

Specifically, the starting from the first RV in the RV basic sequence, sequentially and cyclically using each RV in the RV basic sequence in turn as the RV corresponding to each transmission occasion includes: in a case that a total number k of the RVs in the RV basic sequence is greater than or equal to a total number q of the transmission occasions, an RV corresponding to an n-th transmission occasion is determined by an n-th value in the RV basic sequence; or,

- in a case that the total number k of the RVs in the RV basic sequence is less than the total number q of the transmission occasions, the RV corresponding to the n-th transmission occasion is determined by a [mod(n−1, k)+1]-th value in the RV basic sequence; where $1 \leqslant n \leqslant q$, and n is an integer.

In the second example, the first processing sub-module includes: a second processing unit for starting from an RV corresponding to an RV index, sequentially and cyclically using each RV in the RV basic sequence in turn as the RV corresponding to each transmission occasion.

Specifically, the starting from the RV corresponding to the RV index, sequentially and cyclically using each RV in the RV basic sequence in turn as the RV corresponding to each transmission occasion includes: an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Furthermore, the data transmission device further includes: a first processing module for agreeing with the base station on the RV index before determining the correspondence relationship between each RV in the RV basic sequence and each transmission occasion; or receiving the RV index sent by the base station.

Considering the independent mapping relationships between different RV sequences and TRPs, in some embodiments of the present disclosure, the RV index includes a first RV sub-index corresponding to a first transmission configuration indication state (TCI state) and a second RV sub-index corresponding to a second TCI state.

Wherein, in a case that there is lack of information or omission of information for the first RV sub-index, the first RV sub-index is the same as the second RV sub-index; in a case that there is lack of information or omission of information for the second RV sub-index, the second RV sub-index is the same as the first RV sub-index.

Considering the independent mapping relationships between different RV sequences and TRPs, in some embodiments of the present disclosure, the RV identification information includes a first sub-identification information corresponding to a first transmission configuration indication state (TCI state) and a second sub-identification information corresponding to a second TCI state.

Accordingly, the first determination module includes: a first determination sub-module for determining a first RV basic sequence corresponding to the first TCI state according to the first sub-identification information; and determining a second RV basic sequence corresponding to the second TCI state according to the second sub-identification information;

the second determination module includes: a third determination sub-module for determining a first correspondence relationship between each RV in the first RV basic sequence and each transmission occasion corresponding to the first TCI state; and determining a second correspondence relationship between each RV in the second RV basic sequence and each transmission occasion corresponding to the second TCI state.

Wherein, in a case that there is lack of information or omission of information for the first sub-identification information, the first sub-identification information is the same as the second sub-identification information; in a case that there is lack of information or omission of information for the second sub-identification information, the second sub-identification information is the same as the first sub-identification information.

The transmission occasion may also be configured by the base station, but it is not limited here.

The above information sent by the base station and received by the terminal may be issued through high-level signaling, or may be issued through downlink control information (DCI), which is not limited here.

Wherein the foregoing embodiments implemented by the data transmission method on the terminal side are all applicable to the embodiments of the data transmission device, and the same technical effect can also be achieved.

Figure 8:
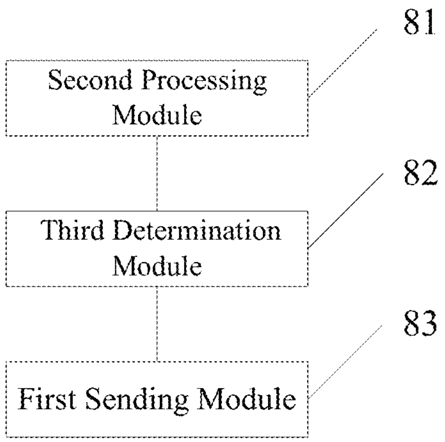
FIG. 8 is a second structural diagram of a data transmission device according to some embodiments of the present disclosure.

Some embodiments of the present disclosure further provide a data transmission device applied to a base station, as shown in FIG. 8, including:

a second processing module 81 for sending redundancy version (RV) identification information to a terminal, and determining an RV basic sequence according to the RV identification information;

a third determination module 82 for determining a correspondence relationship between each RV in the RV basic sequence and each transmission occasion;

a first sending module 83 for sending, at each transmission occasion by using a corresponding RV according to the correspondence relationship, physical downlink shared channel (PDSCH) data to the terminal;

wherein, the RV basic sequence is one of at least two predefined RV sequences.

Through sending redundancy version (RV) identification information to a terminal, and determining an RV basic sequence according to the RV identification information; determining a correspondence relationship between each RV in the RV basic sequence and each transmission occasion; sending, at each transmission occasion by using a corresponding RV according to the correspondence relationship, physical downlink shared channel (PDSCH) data to the terminal; wherein, the RV basic sequence is one of at least two predefined RV sequences; the data transmission device provided by some embodiments of the present disclosure can clearly determine the mapping relationship between the RVs and the transmission occasions during coordinated transmission between multiple TRPs/PANELs, and ensure data transmission between the terminal and the base station, thereby solving the problem in the related art of the inability to configure data transmission caused by that the mapping relationship between the RVs transmitted on multiple TRPs/PANELs and the transmission occasions cannot be determined.

Furthermore, the data transmission device further includes: a second agreement module for agreeing with the terminal on identification information corresponding to each of the at least two RV sequences, before the sending the redundancy version (RV) identification information to the terminal; wherein, the identification information includes the RV identification information.

Specifically, the third determination module includes: a second processing sub-module for cyclically using each RV in the RV basic sequence in turn as the RV corresponding to each transmission occasion, to obtain the correspondence relationship between each RV in the RV basic sequence and each transmission occasion.

As for "the cyclically using each RV in the RV basic sequence in turn as the RV corresponding to each transmission occasion", two examples are provided as follows:

in the first example, the second processing sub-module includes: a third processing unit for starting from a first RV in the RV basic sequence, sequentially and cyclically using each RV in the RV basic sequence in turn as the RV corresponding to each transmission occasion.

Specifically, the starting from the first RV in the RV basic sequence, sequentially and cyclically using each RV in the RV basic sequence in turn as the RV corresponding to each transmission occasion includes: in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod(n−1, k)+1]-th value in the RV basic sequence; where $1 \leqslant n \leqslant q$, and n is an integer.

In the second example, the second processing sub-module includes: a fourth processing unit for starting from an RV corresponding to an RV index, sequentially and cyclically using each RV in the RV basic sequence in turn as the RV corresponding to each transmission occasion.

Specifically, the starting from the RV corresponding to the RV index, sequentially and cyclically using each RV in the RV basic sequence in turn as the RV corresponding to each transmission occasion includes: an RV corresponding to an n-th transmission occasion is determined by a [mod(n−1, k)+RV index+1]-th value in the RV basic sequence;

wherein, n is greater than or equal to 1, and less than or equal to a total number q of the transmission occasions, and n is an integer, k represents a total number of the RVs in the RV basic sequence, RV index represents the RV index, and a value of RV index is an integer greater than or equal to 0 and less than or equal to k−1.

Furthermore, the data transmission device further includes: a third processing module for agreeing with the terminal on the RV index before determining the correspondence relationship between each RV in the RV basic sequence and each transmission occasion; or send the RV index to the terminal.

Considering the independent mapping relationships between different RV sequences and TRPs, in some embodiments of the present disclosure, the RV index includes a first RV sub-index corresponding to a first transmission configuration indication state (TCI state) and a second RV sub-index corresponding to a second TCI state.

Wherein, in a case that there is lack of information or omission of information for the first RV sub-index, the first RV sub-index is the same as the second RV sub-index; in a case that there is lack of information or omission of information for the second RV sub-index, the second RV sub-index is the same as the first RV sub-index.

Considering the independent mapping relationships between different RV sequences and TRPs, in some embodiments of the present disclosure, the RV identification information includes a first sub-identification information corresponding to a first transmission configuration indication state (TCI state) and a second sub-identification information corresponding to a second TCI state.

Accordingly, the second processing module includes: a second determination sub-module for determining a first RV basic sequence corresponding to the first TCI state according to the first sub-identification information; and determining a second RV basic sequence corresponding to the second TCI state according to the second sub-identification information.

The third determination module includes: a fourth determination sub-module for determining a first correspondence relationship between each RV in the first RV basic sequence and each transmission occasion corresponding to the first TCI state; and determining a second correspondence relationship between each RV in the second RV basic sequence and each transmission occasion corresponding to the second TCI state.

Wherein, in a case that there is lack of information or omission of information for the first sub-identification information, the first sub-identification information is the same as the second sub-identification information; in a case that there is lack of information or omission of information for the second sub-identification information, the second sub-identification information is the same as the first sub-identification information.

The transmission occasion may also be configured by the base station, but it is not limited here.

The above information sent by the base station to the terminal may be issued through high-level signaling, or may be issued through downlink control information (DCI), which is not limited here.

Wherein the foregoing embodiments implemented by the data transmission method on the base station side are all applicable to the embodiments of the data transmission device, and the same technical effect can also be achieved.

It should be noted that many functional components described in this specification are referred to as modules/sub-modules/units, in order to emphasize the independence of their implementations more particularly.

In some embodiments of the present disclosure, the modules/sub-modules/units/subunits may be implemented by software so as to be executed by various types of processors. For example, an identified executable code module may include one or more physical or logical blocks of computer instructions, for example, it may be constructed as an object, process, or function. Nevertheless, the executable codes of the identified module do not need to be physically located together, but may include different instructions stored in different bits. When these instructions are logically combined together, they constitute a module and implement the prescribed goal of the module.

In fact, the executable code module can be a single instruction or many instructions, and can even be distributed on multiple different code segments, distributed in different programs, and distributed across multiple storage devices. Likewise, operating data can be identified within the module, and can be implemented in any suitable form and organized in any suitable type of data structure. The operating data may be collected as a single data set, or may be distributed in different locations (including on different storage devices), and at least partly may only exist as an electronic signal on a system or a network.

When modules, units, sub-modules, sub-units, etc. can be implemented by software, considering the related hardware process technic level, modules that can be implemented by software, regardless of cost, can be built as corresponding hardware circuits to implement corresponding functions by those skilled in the art. The hardware circuit includes a conventional very large-scale integration (VLSI) circuit or gate array and related semiconductors such as logic chips and transistors or other discrete components. Modules can also be implemented with programmable hardware devices, such as field programmable gate arrays, programmable array logic, programmable logic devices, etc.

A person of ordinary skill in the art can understand that all or part of the processes in the methods of the foregoing embodiments can be implemented by controlling the relevant hardware through a computer program. The program can be stored in a computer readable storage medium. During execution, the program may include the processes of the foregoing method embodiments. Wherein, the storage medium may be a magnetic disk, an optical disc, a Read-Only Memory (ROM), or a Random Access Memory (RAM), etc.

The above are alternative implementations of the present disclosure. It should be noted that, for those of ordinary skill in the art, without departing from the principles described in the present disclosure, several improvements and modifications can be made, and these improvements and modifications should also be regarded as the protection scope of this disclosure.

What is claimed is:

1. A data transmission method applied to a terminal, comprising:

receiving redundancy version (RV) identification information sent by a base station, wherein the RV identification information comprises a first sub-identification information corresponding to a first transmission configuration indication state (TCI state) and a second sub-identification information corresponding to a second TCI state;

determining a first RV basic sequence corresponding to the first TCI state according to the first sub-identification information;

determining a second RV basic sequence corresponding to the second TCI state according to the second sub-identification information;

determining a first correspondence relationship between each RV in the first RV basic sequence and each transmission occasion corresponding to the first TCI state;

determining a second correspondence relationship between each RV in the second RV basic sequence and each transmission occasion corresponding to the second TCI state; and receiving, at each transmission occasion by using a corresponding RV according to the first correspondence relationship and the second correspondence relationship, physical downlink shared channel (PDSCH) data sent by the base station;

wherein the determining of the correspondence relationship between each RV in the RV basic sequence and each transmission occasion comprises:

cyclically using each RV in the RV basic sequence in turn as the RV corresponding to each transmission occasion, to obtain the correspondence relationship between each RV in the RV basic sequence and each transmission occasion.

2. The data transmission method according to claim 1, wherein before the receiving the redundancy version (RV) identification information sent by the base station, the method comprises:

agreeing with the base station on identification information corresponding to each of the at least two RV sequences;

wherein, the identification information comprises the RV identification information.

3. The data transmission method according to claim 1, wherein the cyclically using each RV in the RV basic sequence in turn as the RV corresponding to each transmission occasion comprises:

starting from a first RV in the RV basic sequence, sequentially and cyclically using each RV in the RV basic sequence in turn as the RV corresponding to each transmission occasion;

wherein the starting from the first RV in the RV basic sequence, sequentially and cyclically using each RV in the RV basic sequence in turn as the RV corresponding to each transmission occasion comprises:

in a case that a total number k of the RVs in the RV basic sequence is greater than or equal to a total number q of the transmission occasions, an RV corresponding to an n-th transmission occasion is determined by an n-th value in the RV basic sequence; or, in a case that the total number k of the RVs in the RV basic sequence is less than the total number q of the transmission occasions, the RV corresponding to the n-th transmission occasion is determined by a [mod (n−1, k)+1]-th value in the RV basic sequence;

where $1 \le n \le q$, and n is an integer.

4. The data transmission method according to claim 1, wherein, the cyclically using each RV in the RV basic sequence in turn as the RV corresponding to each transmission occasion comprises:

starting from an RV corresponding to an RV index, sequentially and cyclically using each RV in the RV basic sequence in turn as the RV corresponding to each transmission occasion;

wherein the starting from the RV corresponding to the RV index, sequentially and cyclically using each RV in the RV basic sequence in turn as the RV corresponding to each transmission occasion comprises:

an RV corresponding to an n-th transmission occasion is determined by a [mod (n−1, k)+RV index+1]-th value in the RV basic sequence;

wherein, n is an integer greater than or equal to 1, and less than or equal to a total number q of the transmission occasions, k represents a total number of the RVs in the RV basic sequence, RV index represents the RV index, and a value of RV index is an integer greater than or equal to 0 and less than or equal to k−1.

5. The data transmission method according to claim 4, wherein before the determining the correspondence relationship between each RV in the RV basic sequence and each transmission occasion, the method comprises:

agreeing with the base station on the RV index; or receiving the RV index sent by the base station.

6. The data transmission method according to claim 4, wherein the RV index comprises a first RV sub-index corresponding to a first transmission configuration indication state (TCI state) and a second RV sub-index corresponding to a second TCI state;

wherein in a case that there is lack of information or omission of information for the first RV sub-index, the first RV sub-index is the same as the second RV sub-index;

in a case that there is lack of information or omission of information for the second RV sub-index, the second RV sub-index is the same as the first RV sub-index.

7. A data transmission method applied to a base station, comprising:

sending redundancy version (RV) identification information to a terminal; wherein, the RV basic sequence is one of at least two predefined RV sequences, and the RV identification information comprises a first sub-identification information corresponding to a first transmission configuration indication state (TCI state) and a second sub-identification information corresponding to a second TCI state;

determining a first RV basic sequence corresponding to the first TCI state according to the first sub-identification information;

determining a second RV basic sequence corresponding to the second TCI state according to the second sub-identification information;

determining a first correspondence relationship between each RV in the first RV basic sequence and each transmission occasion corresponding to the first TCI state;

determining a second correspondence relationship between each RV in the second RV basic sequence and each transmission occasion corresponding to the second TCI state; and sending, at each transmission occasion by using a corresponding RV according to the first correspondence relationship and the second correspondence relationship, physical downlink shared channel (PDSCH) data to the terminal;

where the determining of the correspondence relationship between each RV in the RV basic sequence and each transmission occasion comprises:

cyclically using each RV in the RV basic sequence in turn as the RV corresponding to each transmission occasion, to obtain the correspondence relationship between each RV in the RV basic sequence and each transmission occasion.

8. The data transmission method according to claim 7, wherein before the sending the redundancy version (RV) identification information to the terminal, the method comprises:

agreeing with the terminal on identification information corresponding to each of the at least two RV sequences;

wherein, the identification information comprises the RV identification information.

9. A base station comprising a storage, a processor, a transceiver, and a computer program stored in the storage and capable of being executed by the processor, wherein the processor is configured to execute the computer program to implement the steps of a data transmission method according to claim 7.

10. A terminal comprising a storage, a processor, a transceiver, and a computer program stored in the storage and capable of being executed by the processor, wherein the processor is configured to execute the computer program to implement the following steps:

receiving by the transceiver redundancy version (RV) identification information sent by a base station, wherein the RV identification information comprises a first sub-identification information corresponding to a first transmission configuration indication state (TCI state) and a second sub-identification information corresponding to a second TCI state;

determining a first RV basic sequence corresponding to the first TCI state according to the first sub-identification information;

determining a second RV basic sequence corresponding to the second TCI state according to the second sub-identification information;

determining a first correspondence relationship between each RV in the first RV basic sequence and each transmission occasion corresponding to the first TCI state;

determining a second correspondence relationship between each RV in the second RV basic sequence and each transmission occasion corresponding to the second TCI state; and receiving by the transceiver, at each transmission occasion by using a corresponding RV according to the first correspondence relationship and the second correspondence relationship, physical downlink shared channel (PDSCH) data sent by the base station;

where the determining of the correspondence relationship between each RV in the RV basic sequence and each transmission occasion comprises:

cyclically using each RV in the RV basic sequence in turn as the RV corresponding to each transmission occasion, to obtain the correspondence relationship between each RV in the RV basic sequence and each transmission occasion.

11. The terminal according to claim 10, wherein the processor is further configured to:

agree with the base station on identification information corresponding to each of the at least two RV sequences before receiving the redundancy version (RV) identification information sent by the base station;

wherein, the identification information comprises the RV identification information.

* * * * *